United States Patent Office 3,317,625
Patented May 2, 1967

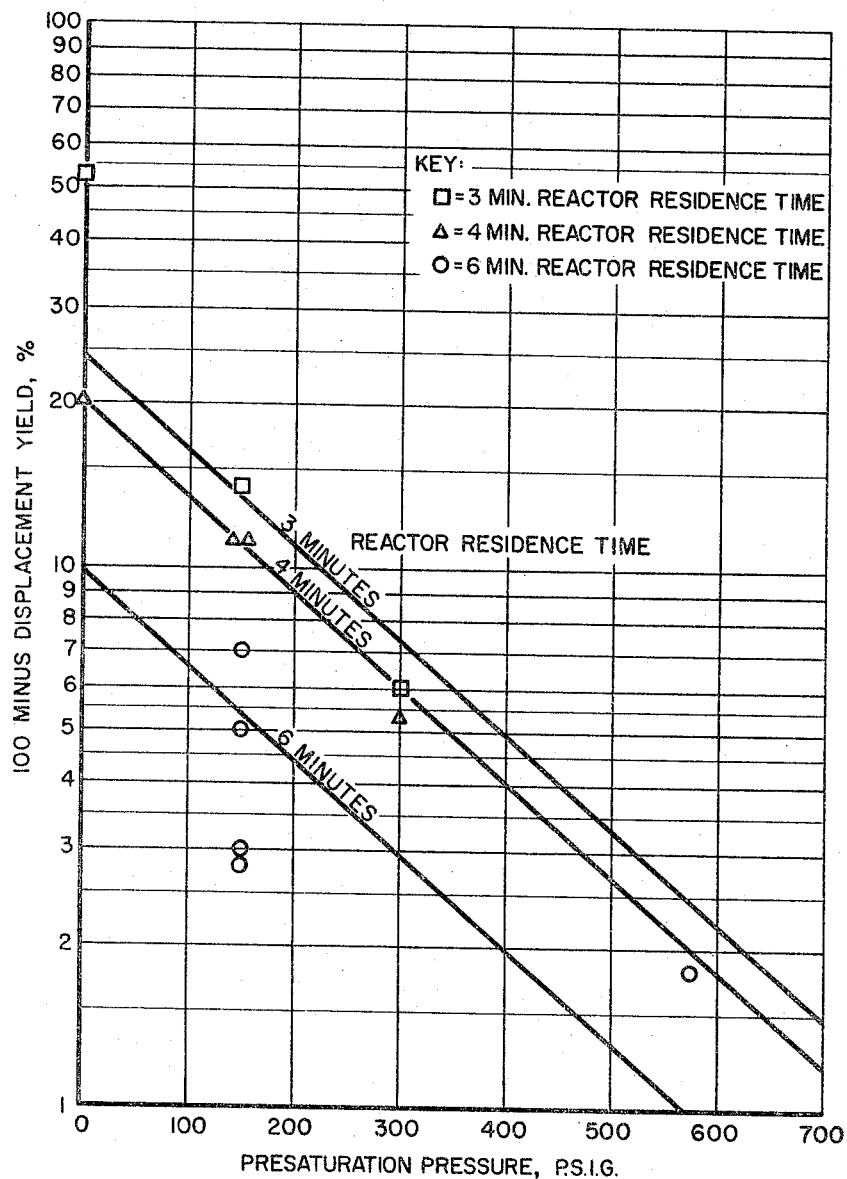

3,317,625
PROCESS FOR DISPLACEMENT OF TRIALKYL-ALUMINUM IN THE PREPARATION OF ALPHA OLEFINS
William B. Carter and William C. Ziegenhain, Ponca City, Okla., assignors to Continental Oil Company, Ponca City, Okla., a corporation of Delaware
Filed Oct. 15, 1964, Ser. No. 404,087
9 Claims. (Cl. 260—677)

This invention relates to preparation of alpha-olefins.

In one of its aspects, this invention relates to the preparation of alpha-olefins by the displacement of alkyl radicals of aluminum trialkyl with ethylene.

It is known that alpha-olefins can be prepared via aluminum-organic chemistry by the so-called "growth" process and the subsequent displacement of the alkyl radical of the "growth" product with an olefin such as ethylene in the presence of a displacement catalyst such as nickel or a nickel compound. The "growth" process can be represented as follows:

(1) 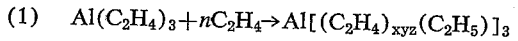

where $Al[(C_2H_4)_{xyz}(C_2H_5)]_3$ is an aluminum alkyl with three straight chain alkyl groups of varying length such that the sum $x+y+z=n$. In this "growth" reaction, the distribution of alkyl groups follows a Poisson distribution. The conditions of the reaction generally are: (1) temperature 225–260° F., (2) ethylene pressure 750–2500 p.s.i.g., and (3) residence time 1 to 4 hours, depending on the Poisson distribution desired.

The starting aluminum alkyl is preferably aluminum triethyl, however, dialkyl substituents can be used such as diethylaluminum hydride, as well as similar aluminum alkyls wherein the alkyl radical contains 2 to 40 carbon atoms. However, generally the starting aluminum alkyl will contain alkyl radicals of 2 to 4 carbon atoms such as aluminum tripropyl and aluminum tributyl and the monohydrides of these as well as mixed aluminum alkyls of such radicals, e.g. diethylisopropylaluminum and the like.

The displacement reaction can be represented as follows:

(2) 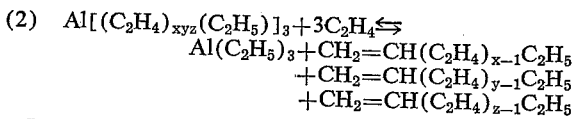

In general, the olefins will contain 4 to 30 carbon atoms, preferably 10 to 20 carbon atoms, e.g. each of $x$, $y$ and $z$ is an integer of 1 to 14.

Although the displacement can be carried out thermally, however, generally the displacement is carried out catalytically. In the case of continuous catalytic displacement, the reaction conditions are generally (1) temperature 200–240° F., (2) ethylene pressure 75–1000 p.s.i.g., (3) residence time 2–5 minutes, (4) catalyst concentration 10–30 parts by weight of catalyst per million parts of aluminum alkyl with the preferred catalyst being active nickel. In batch displacement, as disclosed in the copending application of William C. Ziegenhain, Ser. No. 409,274, filed Nov. 5, 1964, the displacement conditions are generally: (1) temperature 75–125° F., (2) ethylene pressure 150–500 p.s.i.g., (3) residence time 4–12 hours, (4) catalyst concentration 10–30 parts by weight of catalyst per million parts aluminum alkyl with the preferred catalyst being active nickel. The active nickel catalyst can be prepared by mixing a nickel-organic material, such as nickel naphthenate, with aluminum alkyls.

In the prior art processes, the aluminum trialkyl, catalyst and ethylene are separately fed to the reaction zone or catalyst and aluminum trialkyl are premixed just prior to being introduced to the reaction zone. An isomerization inhibitor such as propargyl alcohol is also frequently utilized to obtain maximum n-olefin.

Although the prior art method is being successfully utilized to produce alpha-olefins, for maximum displacement, prolonged residence time at high temperature is required resulting in considerable isomerization. For a high purity n-olefin, maximum displacement has to be sacrificed.

The alpha-olefins and the triethylaluminum produced according to Equation 2 can be separated and recovered by fractional distillation or by other means known to the art. The triethylaluminum after being separated can be returned to the growth reaction. The actual process, however, is not as simple as Equation 2 indicates. This is true because the triethylaluminum and the alpha-olefins contained in the displacement product tend to undergo a reverse displacement reaction, and for that reason Equation 2 is written as a reversible reaction. Furthermore, under the conditions present, there is a tendency for the alpha-olefins to isomerize. The displacement catalyst accelerates both of these tendencies.

It is, therefore, an object of the present invention to provide an improved method of producing normal alpha-olefins. It is another object of this invention to provide a method of obtaining a high displacement percentage of alpha-olefins by displacement of aluminum alkyls with ethylene in the presence of a displacement catalyst. Other objects and advantages of this invention will become apparent from this specification and the claims.

These and other objects of the invention are obtained by pre-saturating the aluminum trialkyl with the displacing olefin, e.g. ethylene, prior to introducing said aluminum trialkyl to the reactor.

The aluminum trialkyls are those obtained by the so-called growth process as defined above.

Suitable catalysts include the so-called reduction catalysts such as nickel, cobalt, palladium and certain iron compounds. The preferred catalyst is nickel or a nickel compound which will react with the trialkylaluminum compound. The second choice catalyst is cobalt. Specific nickel catalysts include finely divided metallic nickel, Raney nickel, nickel acetylacetonate, nickel naphthenate, etc. Karl Ziegler has designated such catalyst in his work on this subject, broadly, as "colloidal" nickel catalyst. The amount of catalyst used can be varied greatly. When the preferred catalyst is employed, the amount used may vary from about 0.001 to 0.1 percent based upon the weight of the growth product, all of this being known to the art.

Suitable displacing olefins are the lower molecular weight, say 2 to 6 carbon atom alpha-olefins. Preferably the displacing olefin will contain 2 to 4 carbon atoms, and most generally ethylene since it is the triethylaluminum most frequently employed in the growth process. Suitable olefins then would include ethylene, propylene, butylene, isobutylene, pentene-1, 3-methylpentene-1, hexene-1 and the like having a terminal double bond.

In carrying out the process of this invention, the aluminum trialkyl is presaturated with the lower olefin. This can be accomplished by adding the lower olefin, ethylene, to the aluminum trialkyl feed stream. Preferably, the preactivation will be done in a separate zone, for example, in the aluminum alkyl storage zone and the olefin thoroughly mixed with the aluminum compound. It is not necessary to mix all of the displacement olefin with the aluminum compound, for example a portion of the ethylene sufficient to obtain the desired pre-saturated pressure can be mixed with the trialkylaluminum and the remaining portion added directly to the reaction zone. In a batch operation, for example, the ethylene and the trialkylaluminum can be mixed in the reaction zone prior to introduction of the catalyst and isomerization inhibitor if the latter is utilized. While any presaturation pressure is helpful, preferably the presaturation pressure will be in the range 300 to 1000 p.s.i.g. The presaturation pressure will generally be at room temperature, but in any case should be below the temperature wherein thermal displacement will occur in significant amount. After the presaturation, the total ingredients can be fed directly to the reaction zone. If desired, the presaturated material can be depressurized; however, this would ordinarily be of no advantage.

*Examples*

Several runs were made to show the effect of presaturation at various reactor residence times. The conditions and results of the various runs are tabulated in the table. The displacement yields at various residence times are plotted in the figure as 100 minus displacement yield, in percent.

It can readily be seen from the table and the figure that increased ethylene presaturation greatly increases the displacement yield. Two aluminum trialkyls were used. They are identified as "A," a semi-works product prepared in Continental Oil Company's Ponca City Research Division installation and "B," obtained from Continental Oil's Lake Charles, Louisiana, plant. The ethylene was commercial ethylene. All of the displacement runs were continuous and made in various type reactors as indicated. The catalyst was nickel naphthenate.

From the table and the figure it can readily be seen that the presaturation pressure has a definite influence on the amount of displacement obtained.

Having thus described the invention, what is claimed is:

1. In the process of recovering olefins from aluminum alkyls by displacement with a low molecular weight alpha-olefin the improvement comprising presaturating said aluminum alkyl with said low molecular weight olefin prior to introducing said aluminum alkyl to displacement conditions.

2. The process of claim 1 wherein the aluminum-alkyl is a trialkyl.

3. The process of claim 2 wherein said alpha-olefin is propylene.

4. The process of claim 2 wherein said alpha-olefin is butene-1.

5. The process of claim 2 wherein said alpha-olefin is ethylene.

6. The process of claim 5 wherein the presaturation is carried out under a pressure of at least 150 p.s.i.g.

7. The process of claim 5 wherein the presaturation is carried out under a pressure in the range 300–1000 p.s.i.g.

8. The process of claim 7 wherein the alkyl substituent on the aluminum trialkyl each contains 6 to 30 carbon atoms.

9. All of the improvements, advantages and features, singularly or in combination, described in either the specificaiton or the claims.

TABLE

| Run | Alum. Alkyl Feed | Reactor Type | Ethylene Presaturated, p.s.i.g. | Nickel Catalyst, p.p.m. (Ni) | Parts Propargyl Alcohol (Ni) | Reactor Pressure, p.s.i.g. | Disp. Product Temp., °F. | Excess Ethylene, Percent | Reactor Residence Time, Min. | Lbs./hr. Alum. Alkyl Feed | Percent Displacement |
|---|---|---|---|---|---|---|---|---|---|---|---|
| 1 | A | ½" pipe x 5' vertical | 0 | 20 | 15 | 470 | 226 | 200 | 3 | 8 | 47 |
| 2 | A | Above packed with ¼" glass helices. | 0 | 15 | 0 | 450 | 230 | | 0.25 | 8 | [1] 17 |
| 3 | B | As in 1 | 300 | 25 | 15 | 450 | 229 | 50 | 3 | 8 | 94 |
| 4 | B | ¾" pipe x 5' vertical | 150 | 25 | 0 | 450 | 227 | 20 | 6 | 8 | 93 |
| | | | | | | | | | 60 | | 97 |
| 5 | B | As in 4 | 150 | 25 | 0 | 450 | 231 | 80 | 4 | 12 | 89 |
| 6 | B | 8' x ⅜" OD plus 66' x ¼" tubing. | 150 | 26 | 0 | 500 | 215 | 65 | 6 | 8 | 97.2 |
| 7 | B | Same as 6 | 300 | 30 | 0 | 600 | 222 | 20 | 4 | 12 | 94.7 |
| 8 | B | Same as 6 | 575 | 28 | 0 | 800 | 230 | 35 | 6 | 8 | 98.2 |
| 9 | B | 1½" pipe x 3' packed with 4 more glass beads. | 145 | 30 | 0 | 450 | 230 | 60 | 4 | 12 | 89 |
| | | | | | | | 600 | | | 6 | 8 | 95 |
| 10 | B | Same as 9 | 0 | 25 | 20 | 450 | 240 | 40 | 4 | 12 | 80 |

[1] Trickled aluminum alkyl through ethylene atmosphere. Residence time too short.

References Cited by the Examiner

UNITED STATES PATENTS

| | | | |
|---|---|---|---|
| 2,863,896 | 12/1958 | Johnson | 260—683.15 |
| 2,889,385 | 6/1959 | Catterall et al. | 260—683.15 |
| 2,906,794 | 9/1959 | Aldrich et al. | 260—683.15 |
| 3,035,104 | 5/1962 | Harvey et al. | 260—683.15 |
| 3,149,179 | 9/1964 | Borden | 260—683.15 |
| 3,206,522 | 9/1965 | Poe et al. | 260—683.15 |
| 3,249,648 | 5/1966 | Carter et al. | 260—677 |

FOREIGN PATENTS 605,512   9/1960   Canada.

ALPHONSO D. SULLIVAN, *Primary Examiner.*